(12) United States Patent
Youda et al.

(10) Patent No.: US 6,178,274 B1
(45) Date of Patent: *Jan. 23, 2001

(54) IMAGE READING APPARATUS AND METHOD FOR PREVENTING ELECTRIC NOISE

(75) Inventors: Yasunobu Youda; Eiki Yoshimizu, both of Kanagawa-ken (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/944,788

(22) Filed: Oct. 6, 1997

(30) Foreign Application Priority Data

Oct. 4, 1996 (JP) .................................................. 8-264576

(51) Int. Cl.[7] .............................. H04N 1/04; G06K 7/00
(52) U.S. Cl. .......................................... 382/312; 358/498
(58) Field of Search ........................ 250/208.1; 428/216; 382/312; 358/482, 483, 494, 496, 497, 498

(56) References Cited

U.S. PATENT DOCUMENTS

| | | | | |
|---|---|---|---|---|
| 4,298,279 | * | 11/1981 | Yoshimura | 355/133 |
| 4,372,673 | * | 2/1983 | Tomosada | 355/14 R |
| 4,474,457 | * | 10/1984 | Phelps | 355/35 |
| 4,805,067 | * | 2/1989 | Amarakoon | 361/212 |
| 4,869,948 | * | 9/1989 | Iida | 428/216 |
| 5,477,047 | * | 12/1995 | Nakagawa | 250/208.1 |
| 5,899,708 | * | 5/1999 | Tanaka | 438/149 |

FOREIGN PATENT DOCUMENTS

| | | |
|---|---|---|
| 62-77966 | 4/1987 | (JP) . |
| 64-70738 | 3/1989 | (JP) . |
| 3-200645 | 9/1991 | (JP) . |

\* cited by examiner

Primary Examiner—Jerome Grant, II
(74) Attorney, Agent, or Firm—Oblon, Spivak, McClelland, Maier & Neustadt, P.C.

(57) ABSTRACT

An image sensor unit, and method, used in an image reading apparatus such as a facsimile machine, image scanner, copier machine, includes a feeding path through which a feeding document, having an imaged to be read, is passed. In the feeding path, the feeding document is passed over a contact glass through which a light from a light source illuminates an image on the feeding document. Reflected light is then detected with a detection and converted into image data. However, unless appropriate measures are taken, the integrity of the image data is subject to corruption as a result of electric noise generated from discharging of excess charge developed on the contact glass when the feeding sheet moves along side of the contact glass. The present image sensor includes a method and mechanism for passing the accumulated charge to ground, thereby avoiding the possibility of electrical discharge and associated electrical noise. Furthermore, the present image sensor includes a transparent thin film made of a material that prevents the accumulation of excess charge.

18 Claims, 6 Drawing Sheets

IMAGE READING APPARATUS AND METHOD FOR PREVENTING ELECTRIC NOISE

BACKGROUND OF THE INVENTION

1. Field of the Invention

The present invention relates to an image sensor units and methods for use in an image reading apparatus such as a facsimile machine, image scanner, copier machine, or other document processing apparatuses. More particularly, the invention relates to a method and image reading unit that prevents an electric charge, which is formed on a feeding document and a contact glass, from accumulating to an excess amount so as to avoid the creation of electric noise due to atmospheric discharge of the electric charge.

2. Discussion of the Background

A conventional image reading apparatus, such as a facsimile machine, has a contact-type image sensor unit with a contact glass on which a subject document (i.e., a feeding document) is brought into contact. The contact glass is located in a document feeding path of the image reading apparatus in such way such that a light source in the image sensor unit illuminates a surface of the feeding document located above the contact glass with respect to the light source. A converging lens is used to converge light reflected from the surface of the feeding document through the contact glass and onto a photoelectric cell. The photoelectric cell receives the reflected light and converts the same to an image data. The image data is then transferred to a main circuit board by way of a transfer device and a lead wire (e.g., a signal line).

According to the conventional contact-type image reading apparatus, the contact glass also functions as a document feeding path (guide), such that the feeding document is brought into contact with the contact glass and rubs against the contact glass when the feeding document is transferred toward and away from the contact glass. This rubbing action causes friction between the contact glass and the feeding document, and thus produces electric charge.

As a result, and as identified by the present inventors, electric charge formed by the frictional contact of the feeding paper and the contact glass may migrate to a frame of the image sensor unit and collect thereon. The accumulated electric charge will remain there until discharged therefrom. One mode of discharge is atmospheric discharge in which the excess electric charge will jump from the frame into the air or to an adjacent device. As recognized by the present inventors, such atmospheric discharge events produce electric noise that may corrupt the data integrity of the image data passed through the lead wire. The net effect of the corrupting the image data is that a resulting image formed on a printed sheet will itself be corrupted "image errors", which are deviations between the reproduced image with respect to the original image (on the feeding document). An example of an "image error" is a black line formed in the reproduced image, where the black line was not present in the original image.

The present inventors have further identified that with modern document processing devices, which operate at increased document reading speeds, electrical noise resulting from electrical discharge of accumulated charge has become even more pronounced than older, slower systems and will affect the quality of reproduced images unless appropriate steps are taken to prevent the atmospheric discharges.

SUMMARY OF THE INVENTION

The present invention has been made in view of the above mentioned problems with conventional image reading devices and methods. Accordingly, an object of the present invention is to provide an image reading apparatus and method that passes an accumulated electric charge to ground (GND) in an orderly fashion so as to prevent radiated emissions resulting from atmospheric electric discharge.

Another object of the present invention is to provide a system that incorporates an image reading apparatus that leads an accumulated electric charge to GND in an orderly fashion so as to prevent electric noise resulting from electric discharge from corrupting an image quality of a reproduced image.

A further object of the present invention is to provide an image reading apparatus that includes a conductive discharging device, a portion of which connects with the contact glass and another portion of which is connected to ground. The discharging device is also configured to function as part of the document feeding guide.

Another object is to provide an image reading apparatus in which the discharging device is made of at least one of a conductive tape and a conductive brush.

Another object of the present invention is to prevent the formation of electric charge by coating a contacting glass with a material that suppresses the formation of electric charge.

In order to achieve the above-mentioned and other objects, there is provided according to the present invention a method and an image reading apparatus having a contact type image sensor unit including; a light source that illuminates a surface of a feeding document positioned opposite a contact glass. A photoelectric device receives a reflection from the surface of the feeding document and converts the reflection into an image data which is ultimately used to form a reproduced image.

In order to position the feeding document in a correct position for being illuminated, a feeding roller is included that feeds the feeding document from the document table towards the contact glass and the photoelectric device. Because electric charge may collect as a result of the feeding contact rubbing against the contact glass, a discharging device is included for the purpose of drawing the charge off the image sensor unit and passing the charge to GND. Alternatively, a transparent film, made of Indium Titanium Oxide, for example, is provided on the contact surface of the contact glass so as to prevent the formation of electric charge.

BRIEF DESCRIPTION OF THE DRAWINGS

A more complete appreciation of the present invention and many of the attendant advantages thereof will be readily obtained as the same becomes understood by reference to the following detailed description when considered in connection with the accompanying drawings, wherein.

DETAILED DESCRIPTION OF THE PREFERRED EMBODIMENTS

Figure 1:
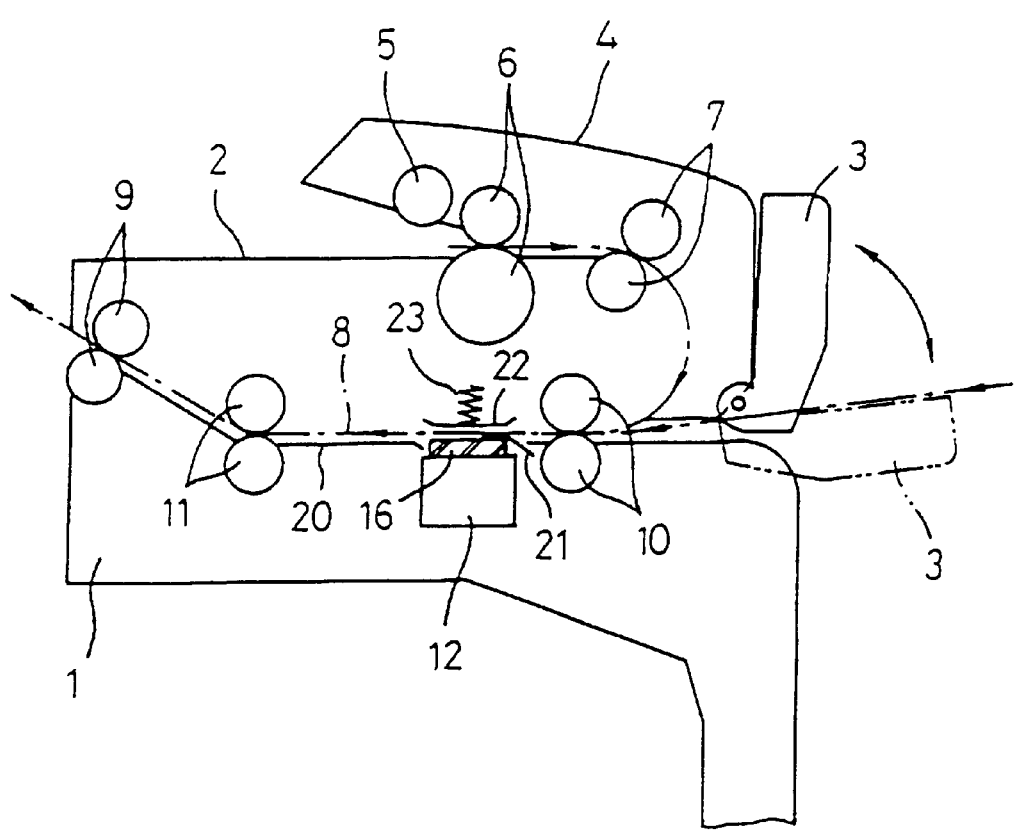
FIG. 1 is a sectional side view of one example of an image reading unit to which the present invention is applicable.

Referring now to the drawings, wherein like reference numerals designate identical or corresponding parts throughout the several views, and more particularly to FIG. 1 thereof, an image reading unit of a facsimile apparatus is shown as an exemplary embodiment of the present invention.

The image reading unit includes a main body 1, a first document table 2 located in an upper part of the main body 1 and a second document table 3, used for manual document feeding, is pivotably mounted on a side of the main body 1, as shown. An upper cover 4 is shown as covering a portion of a document separation mechanism that includes, a pickup roller 5, a first pair of feeding rollers 6 which detaches a document (e.g., a page) from a set of documents (e.g., a stack of pages), and a second pair of feeding rollers 7.

Figure 2:
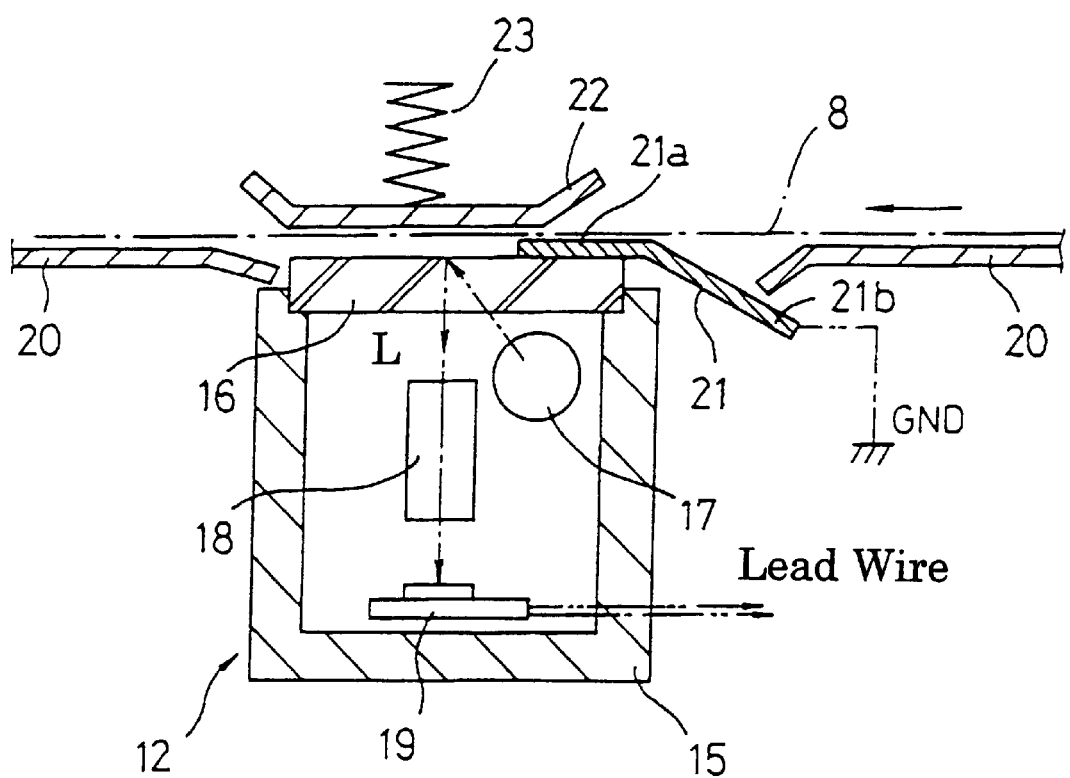
FIG. 2 is a sectional side view of a first image sensor of the present invention adapted for use in the image reading unit of FIG. 1.

The image reading unit also includes a document feeding path 8 shown in FIGS. 1 and 2. The document feeding path includes, in sequence, a third pair of feeding rollers 10, an image sensor 12 that is located at between the third pair of feeding rollers 10 and a fourth pair of feeding rollers 11, and a pair of discharge rollers 9. A document that is fed either from the a first document table 2 or the second document table 3 is sequentially guided along the feeding path 8 by the third pair of feeding rollers 10, the image sensor 12, the fourth pair of feeding rollers 11, and the discharge rollers 9. As will be described in reference to FIG. 2, FIG. 1 also shows a guide board 20, a contact glass 16, a document guide 21, a pressure board 22 and a spring device 23, as shown.

FIG. 2 is a sectional side view of the image sensor 12, described in FIG. 1, along with components that are adjacent thereto. The image sensor 12 includes a main frame 15, the contact glass 16 that covers an opening of an upper part of the main frame 15, a light device 17 that illuminates a surface of the document as the document is fed against the contact glass 16, along the feeding path 8. A converging lens 18 converges reflected light L that is reflected from a surface of the feeding document through the contact glass 16 and to the photoelectric cell 19. The photoelectric cell 19 receives the reflected light L and converts the reflected light L to an image data, which is output from the image sensor 12 via the lead wire (shown as a two conductor wire, although any data output signal line would be suitable), as shown.

Toward the right and left hand sides of FIG. 2, the guide board 20 is shown as defining an upstream and downstream portion of the feeding path 8, where the terms "upstream" and "downstream" are relative to a position where the reflected light L passes through the contact glass 16. A document guide 21 is positioned so as to guide the feeding document from the right hand portion of the guide board 20 toward the contact glass 16. By guiding the feeding document with the document guide 21 helps to lower the risk of a paper jam.

As shown in FIG. 2, a first side part 21a of the document guide 21 is fixed to a contact surface (shown as the upper surface) of the contact glass 16. A second side part 21b is formed so as to extend to away from the position where the reflected light L enters the contact surface of the contact glass 16, and is grounded to a grounding node (or terminal, braid, or strip that is kept at a predetermined voltage potential) as shown. Electric charge that accumulates as a result of the frictional contact between the feeding document and the contacting glass 16 is removed (i.e., drawn off) by being passed to the grounding node by way of the second side part 21b.

A pressure board 22 is positioned so as to face the contact glass 16 and serves to press the feeding document against the contact glass 16 with a spring device 23. The spring device 23 urges the pressure board 22 toward the contact glass 16, but with a sufficiently weak force so as to allow the feeding document to pass between the pressure board 22 and the contact glass 16. Edges of the pressure board 22 are turned away from the feeding path 8 so as to avoid the occurrence of a paper jam when the feeding document approaches and retreats from the pressure board 22.

In the present embodiment, the document guide 21 is made of an electrically conductive material such as a phosphor bronze, a bronze foil, or a plastic film, formed from plastic containing a carbon black. Preferably, an electrical resistance value of the document guide is between 0.01 Ω to 0.1 Ω.

Figure 3:
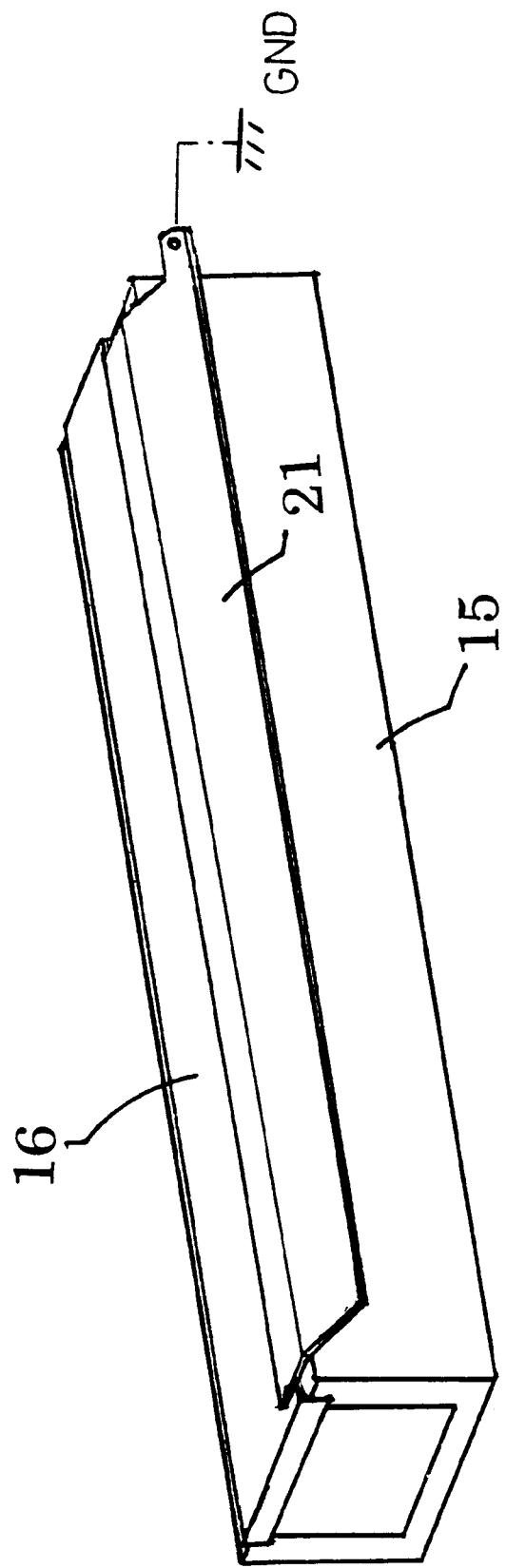
FIG. 3 is a perspective view of the first image sensor of the present invention adapted for use in the image reading unit of FIG. 1.

At least a portion of the second side part 21b of the document guide 21b is grounded (i.e., connected either directly or through a conductor to GND), as shown in FIG. 3, although connection to terminal set to a predetermined voltage potential is an alternative. Consequently, charge accumulated on the contact glass 16, or in the immediate vicinity thereof, is drawn from the contact glass 16 and to GND by way of the second side part 21b. By drawing the charge off of the contact glass 16, the risk of experiencing atmospheric electrical discharge is avoided and so is the risk of corrupting the image data as a result of atmospheric electrical discharge.

Figure 4:
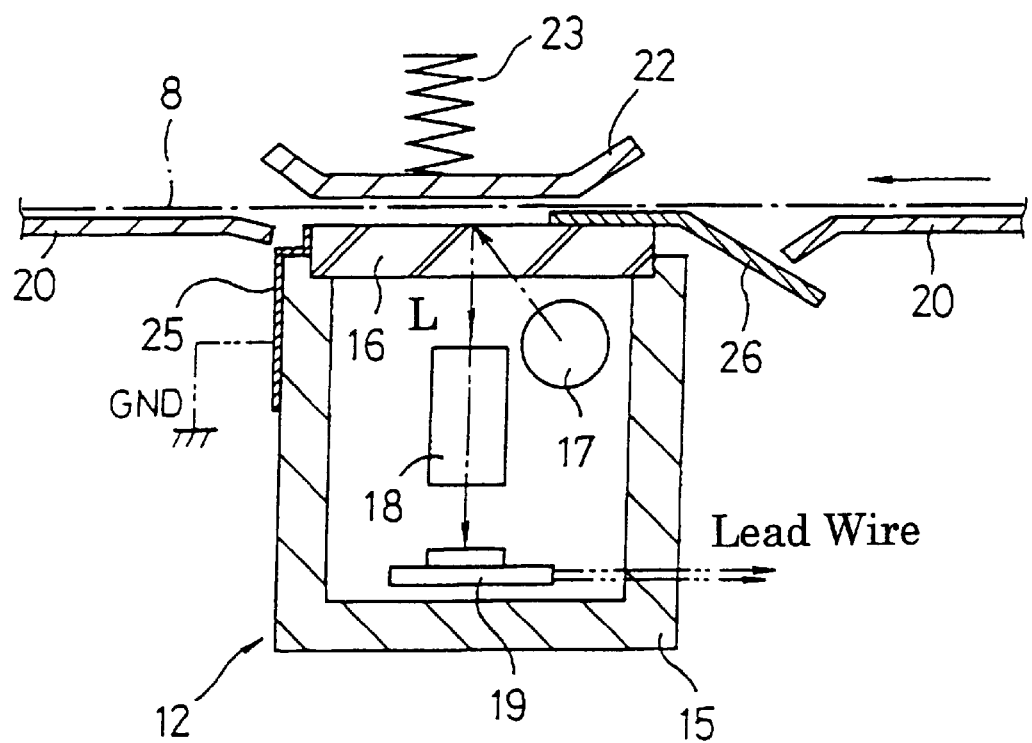
FIG. 4 is a sectional side view of a second image sensor of the present invention adapted for use in the image reading unit of FIG. 1.

FIG. 4 is a section view of a second embodiment of an image sensor according to the present invention. For sake of brevity, elements that are common to those discussed in FIG. 1, 2, and 3, and bearing the same reference numerals will not be further described.

As shown in FIG. 4, an electric conductive tape 25, with adhesive on one side, is adhered to an edge portion of contact glass 16, the main frame 15, and is electrically grounded as shown. The electric conductive tape 25 does not extend into the feeding path 8 so as to avoid becoming a paper jam hazard. Grounding is accomplished with a direct connection to a grounding terminal or by way of an intermediate conduction path, such as a wire that connects the electric conductive tape 25 to a ground terminal. As an alternative to tape, metal foil may also be used in a similar manner. Preferably the ohmic resistance of the electric conductive tape 25 (or foil) is between 0.01 Ω to 0.1 Ω.

When the electric conductive tape 25 is used, the document guide 26 need not be made of a conductive foil or film, if the conductive tape 25 is the only grounding path. However, the document guide 26 may be used as ancillary grounding path if made of a conductive file or foil. Thus, a combination of the first and second embodiments is a feature of the present invention. In either case, the electric charge formed as a result of the feeding document rubbing against the contact glass 16 is led to the GND (ground) by the electric conductive tape 25 (as well as the document guide 26, if conductive and grounded).

Figure 5:
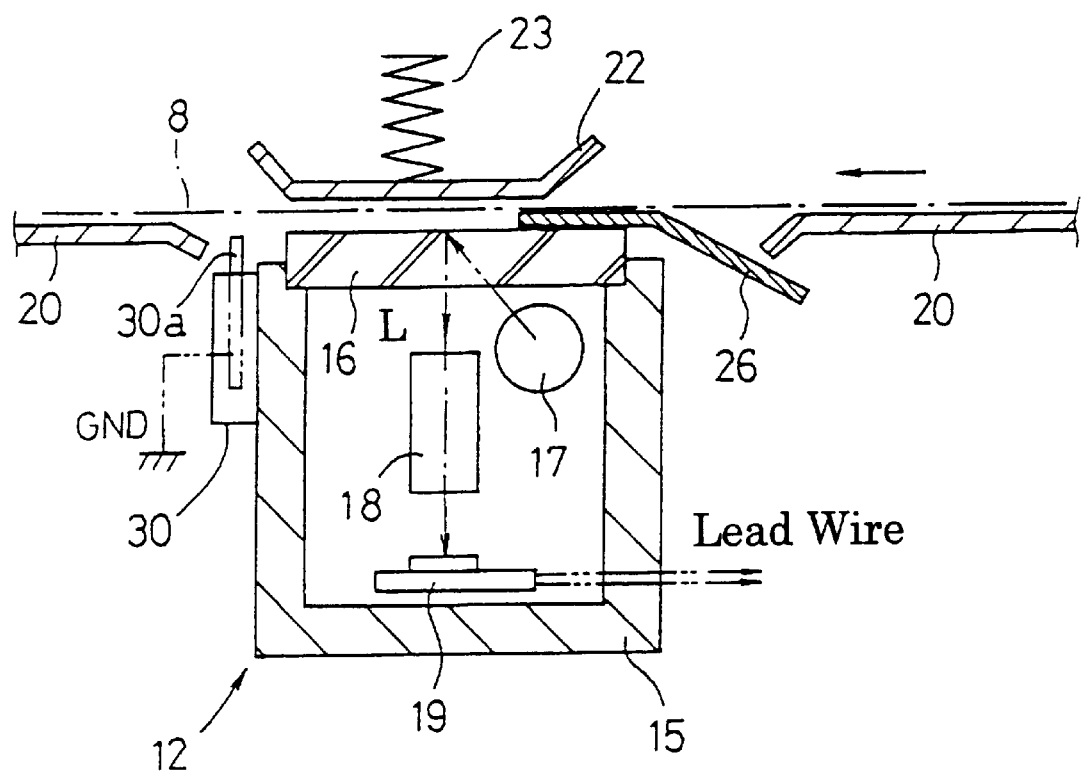
FIG. 5 is a sectional side view of a third image sensor of the present invention adapted for use in the image reading unit of FIG. 1.

FIG. 5 is a section view of a third embodiment of an image sensor 12 of the present invention. Unlike the previous embodiments, this image sensor 12 includes a discharging brush 30, as shown. A top 30a of the discharging brush 30 is located near the contact glass 16 but does not necessarily contact the contact glass 16. Electric charge collected on the feeding document and contact glass is drawn off of the feeding document and contact glass 16 as soon as a leading edge of the feeding document approaches the discharging brush 30. Disparity in electric potential between the accumulated charge and the ground potential of the brush 30 cause the accumulated electric charge to migrate from the region about the contact glass 16 and to GND, by way of the brush 30. The brush 30 is electrically coupled to the charge on the accumulated charge, either by direct contact with the feeding document or by capacitive coupling to the feeding document or contact glass 16 by closely positioning the brush end 30a to either the contact glass 16 or the feeding document. It is desired that the ohmic resistance value of a material used to form the discharging brush 30 is between 0.01 Ω to 0.1 Ω.

The brush 30 may be used in combination with any of the previously described first and second embodiments for removing accumulated charge from the region around the contact glass 16.

Figure 6:
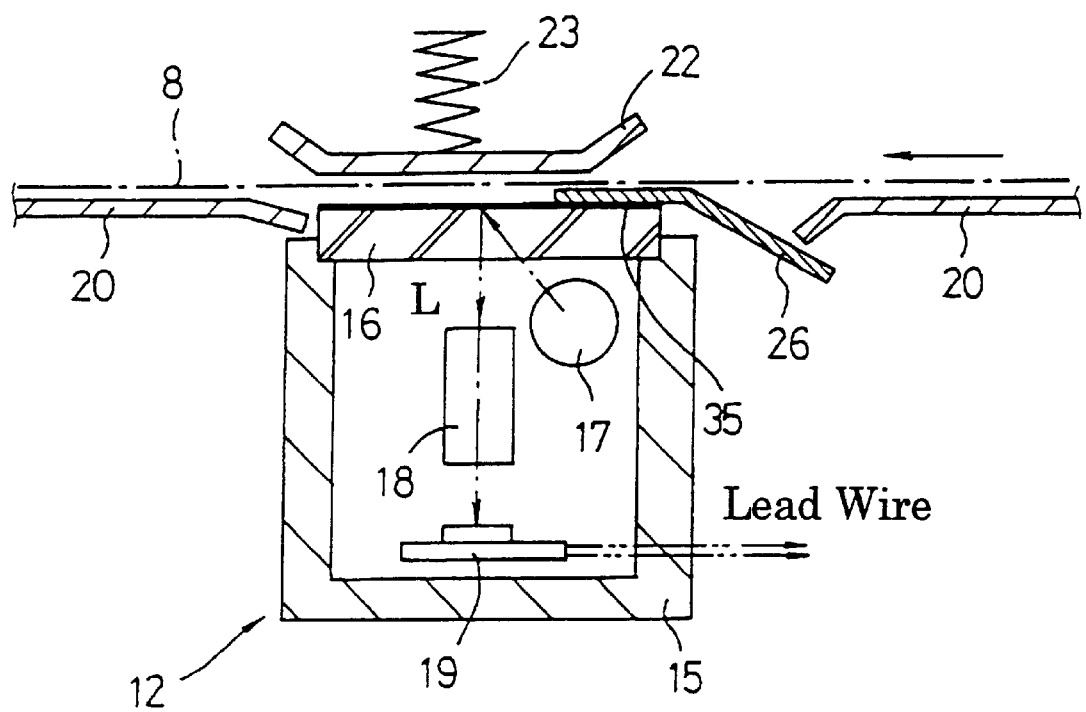
FIG. 6 is a sectional side view of a fourth image sensor of the present invention adapted for use in the image reading unit of FIG. 1.

FIG. 6 is a section view of a fourth embodiment of the image sensor 12 of the present invention, in which a transparent thin film 35 is formed on the contact surface of the contact glass 16. An example material from which the transparent thin film 35 is made is Indium Titanium Oxide. By employing the transparent thin film 35, which may be an electrically conductive material, light from the light device can penetrate the transparent thin film 35 so as to illuminate the feeding document, yet the material used for the transparent thin film 35 prevents the electrical charge from being formed in the first place. Thus, the present embodiment is different from the previously discussed embodiments in that the present embodiment operates prospectively so as to prevent the charge from accumulating in the first place, and the other embodiments operate reactively in that provisions are made for removing the electrical charge after the electrical charge accumulates. Accordingly, the transparent thin film 35 may be used cooperatively other combinations of the other embodiments to suppress the effects of electric discharges on image quality of the reproduced image.

Therefore, this present invention solves the problem that an accumulated electric charge is led to the main frame 15 and then passed to ground so as to avoid, the occurrence of electrical discharge events which have been observed as exerting an image corruption effect on image data output from the image sensor via the lead wire. For example, by employing the inventive concepts described herein, the presence of black lines on a printed image is successfully avoided.

While the above description provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

To this end, obviously, numerous (additional) modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image reading apparatus having a contact type image sensor unit, comprising:

a contact glass having a surface on which a feeding document is passed during an image reading operation;

a light source device that emits light directed through the surface of said contact glass so as to illuminate a surface portion of the feeding document;

a photoelectric device that receives a reflected light from the surface portion of the feeding document while the feeding document is moving and converts the reflected light to an image data that is passed through a data output signal line;

a feeding mechanism that feeds the feeding document towards the contact glass and said photoelectric device during said image reading operation; and a discharging device having one portion that is connected to said contact glass, and another portion being connected to a node having a predetermined voltage potential, wherein accumulated electric charge, developed as a result of said feeding document being passed against said contact glass and said discharging device, is drawn away from said contact glass and said feeding document and to said node, said discharging device being on a same side of said feeding document as said photoelectric device.

2. An image reading apparatus according to claim 1, wherein:

said discharging device being positioned so as to guide a movement of said feeding document during said image reading operation and serving as a document feeding guide.

3. An image reading apparatus according to claim 1, wherein:

said discharging device comprises an electrically conductive tape.

4. An image reading apparatus according to claim 1, wherein said feeding mechanism comprises a feeding roller.

5. An image reading apparatus according to claim 1, wherein;

an electrically conductive film being formed on a surface of said contact glass on which said feeding document is passed, the electric conductive film comprises a layer of Indium Titanium Oxide.

6. An image reading apparatus having a contact type image sensor unit, comprising:

a contact glass having a surface on which a feeding document is passed during an image reading operation;

a light source device that emits light directed through the surface of said contact glass so as to illuminate a surface portion of the feeding document;

a photoelectric device that receives a reflected light from the surface portion of the feeding document and converts the reflected light to an image data;

a feeding mechanism that feeds the feeding document towards the contact glass and said photoelectric device during said image reading operation; and a discharging device having one portion that is separated from said contact glass and connected to a node having a predetermined voltage potential, wherein accumulated electric charge, developed as a result of said feeding document being passed against said contact glass and said discharging device, is drawn away to said node from said contact glass and said feeding document by way of said feeding document, said discharging device being on a same side of said feeding document as said photoelectric device, said discharging device being located downstream from said contact glass, where downstream is in reference to a moving direction of said feeding document, said discharging device not in direct contact with said contact glass; and said discharging device being made of an electrically conductive material.

7. An image reading apparatus having a contact type image sensor unit, comprising:

means for moving a feeding document against a contact surface of said contact type image sensor during an image reading operation;

means for illuminating a surface portion of said feeding document with a light transmitted through said contact surface while said feeding document is moving;

means for receiving a reflected light that is reflected from said surface portion of said feeding document and through said contact surface;

means for converting said reflected light into image data to be passed through a data output signal line; and means for preventing electric noise from being generated due to an excess accumulation of electric charge attributed to said feeding document being brought into contact with said contact surface and said means for preventing electric noise, said means for preventing comprises means for removing said accumulation of electric charge by conducting said electric charge away from an interface between said contact surface and said feeding document and to a node having a predetermined voltage potential, said means for removing being positioned on a same side of said feeding document as said means for illuminating.

8. The apparatus of claim 7, wherein said node being a ground terminal that is grounded.

9. The apparatus of claim 7, wherein said means for bringing comprises a document feeding guide for guiding a direction of movement of said document, said means for bringing comprising said means for preventing.

10. The apparatus of claim 7, wherein said means for removing said accumulation of electric charge includes adhering a first portion of a conductive material to said contact surface and coupling another portion of said conductive material to a node having a predetermined voltage potential.

11. The apparatus of claim 10, wherein said node being a ground terminal that is grounded.

12. The apparatus of claim 7, wherein said means for preventing being positioned on a same side of said feeding document as said means for illuminating and comprises means for removing said accumulated charge by electrically coupling the feeding document and contact surface with an electrical conductor when said feeding document is contacting said contact surface.

13. The apparatus of claim 7, wherein said means for preventing comprises means for coating said contact surface with a material having a property that suppresses a formation of said electric charge when said feeding document is brought in contact with said contact surface.

14. A method for suppressing electric noise in an image reading apparatus having a contact type image sensor unit, comprising the steps of:

moving a feeding document against a contact surface of a contact glass during an image reading operation;

illuminating a surface portion of said feeding document with a light transmitted through said contact surface while said feeding document is moving;

receiving a reflected light that is reflected from said surface portion of said feeding document and through said contact surface;

converting said reflected light into image data;

passing said image data through a data output signal line; and preventing the generation of electric noise due to an excess accumulation of electric charge resulting from said feeding document being brought into contact with said contact surface, wherein, said preventing step comprises removing said accumulation of electric charge by conducting said electric charge away from an interface between said contact surface and said feeding document and to a node having a predetermined voltage potential, wherein said conducting said electric charge away from the interface between said contact surface and said feeding document step is performed on a same side of said feeding document as said illuminating step is performed.

15. The method of claim 14, wherein said bringing step comprises guiding said feeding document with an electrically conductive document feeding guide and grounding said document feeding guide.

16. The method of claim 14, wherein said step of preventing comprises removing said accumulation of electric charge by adhering a first portion of a conductive material to said contact surface and coupling another portion of said conductive material to a node having a predetermined voltage potential.

17. The apparatus of claim 14, wherein said preventing step comprises coating said contact surface with a material having a property that suppresses a formation of said electric charge when said feeding document is brought in contact with said contact surface.

18. A method for suppressing electric noise in an image reading apparatus having a contact type image sensor unit, comprising the steps of:

moving a feeding document against a contact surface of a contact glass during an image reading operation;

illuminating a surface portion of said feeding document with a light transmitted through said contact surface while said feeding document is moving;

receiving a reflected light that is reflected from said surface portion of said feeding document and through said contact surface;

converting said reflected light into image data;

passing the data through a data output signal line; and preventing the generation of electric noise due to an excess accumulation of electric charge resulting from said feeding document being brought into contact with said contact surface, wherein, said preventing step comprises removing said accumulation of electric charge by conducting said electric charge away from an interface between said contact surface and said feeding document by way of said feeding document and to a node having a predetermined voltage potential wherein said preventing step comprises removing said accumulated charge by coupling the feeding document to an electrical conductor when said feeding document is contacting said contact surface, wherein said conducting said electric charge away from the interface between said contact surface and said feeding document step is performed on a same side of said feeding document as said illuminating step is performed.

* * * * *